United States Patent [19]

Sargent

[11] 4,143,801
[45] Mar. 13, 1979

[54] MULTIPLE WELDING HEAD SYSTEM FOR FABRICATING PIPE

[75] Inventor: Claud B. Sargent, Miloxi, Mich.

[73] Assignee: Michael P. Breston, Houston, Tex.; a part interest

[21] Appl. No.: 767,172

[22] Filed: Feb. 9, 1977

[51] Int. Cl.² .................... B23K 9/00; B23K 37/02; B23K 31/06
[52] U.S. Cl. .................................. 228/17.5; 228/26; 219/60 R; 219/61.6
[58] Field of Search ................ 228/17.5, 26, 28, 32; 219/60 R, 61.6

[56] References Cited

U.S. PATENT DOCUMENTS

| | | | |
|---|---|---|---|
| 1,801,140 | 4/1931 | Chapman | 228/32 X |
| 2,679,817 | 6/1954 | Grabner | 228/32 |
| 3,075,484 | 1/1963 | Benteler | 228/17.5 X |

Primary Examiner—Al Lawrence Smith
Assistant Examiner—K. J. Ramsey
Attorney, Agent, or Firm—Michael P. Breston

[57] ABSTRACT

A pipe is fabricated from rolls of flat metal plate by continuously moving the plate into a pipe-forming station which shapes the flat plate into a pipe having a longitudinal seam therealong. A plate arc welding machine welds consecutive plates to each other thereby maintaining continuity of plate movement. Equal sections of the longitudinal seam are consecutively welded in a leapfrogging manner using two welding units movably positioned on the opposite sides of the moving pipe. The welding units alternatingly weld alternate and overlapping sections of the longitudinal seam. The welding operations are carried out without interference with the continuous movement of the pipe.

4 Claims, 17 Drawing Figures

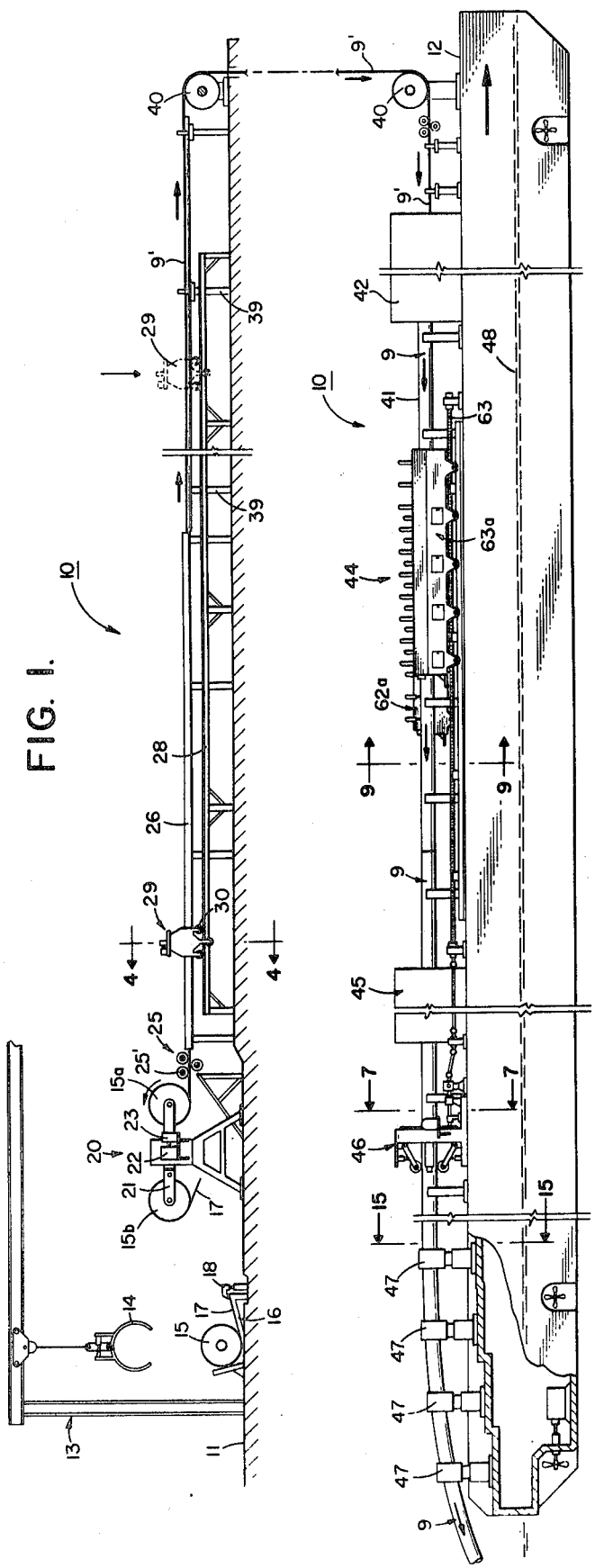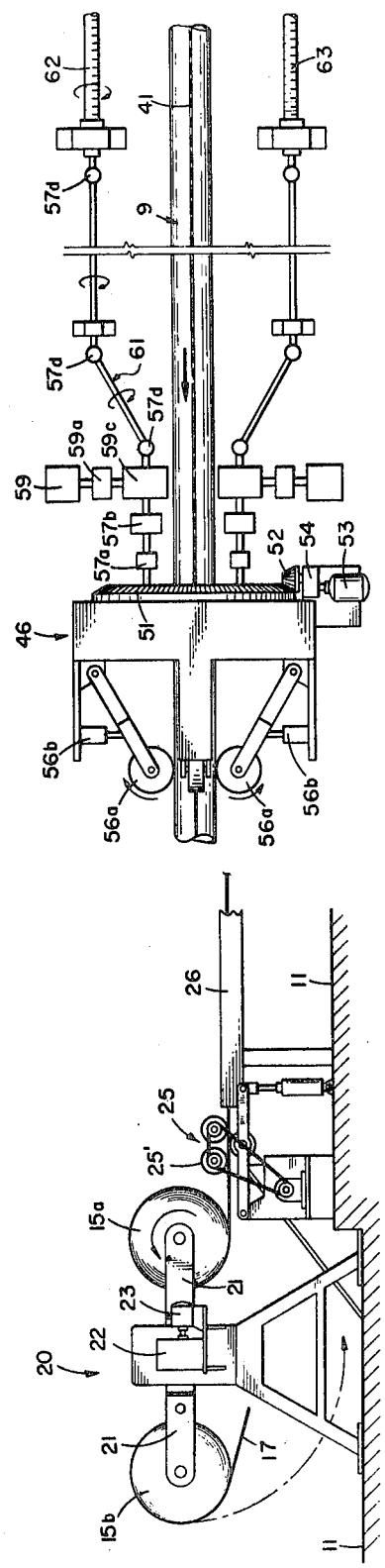

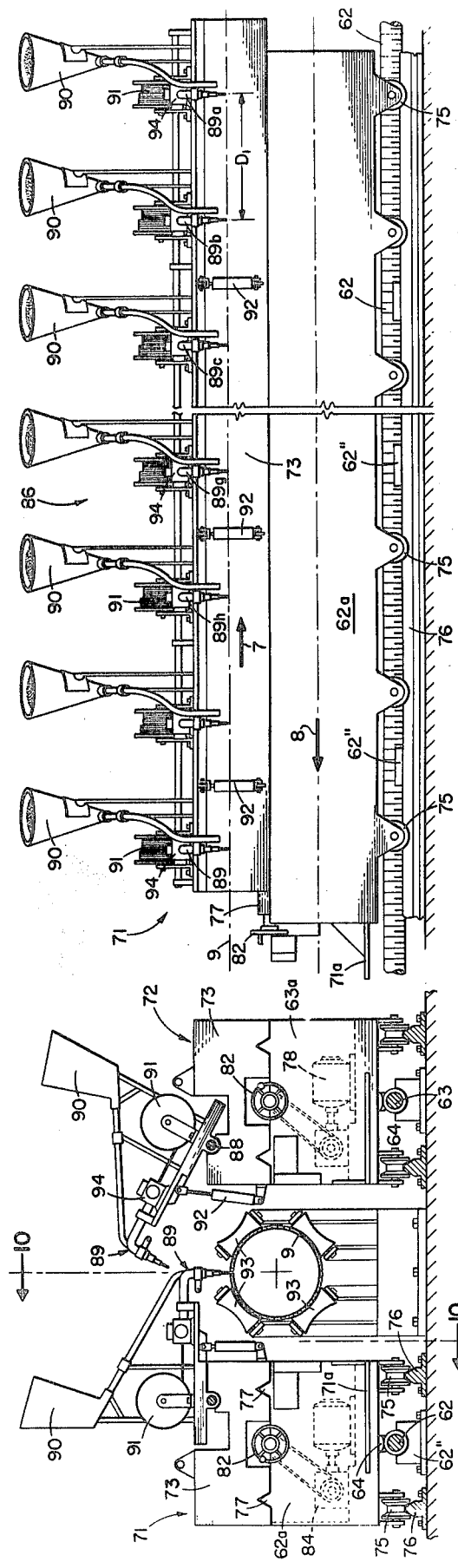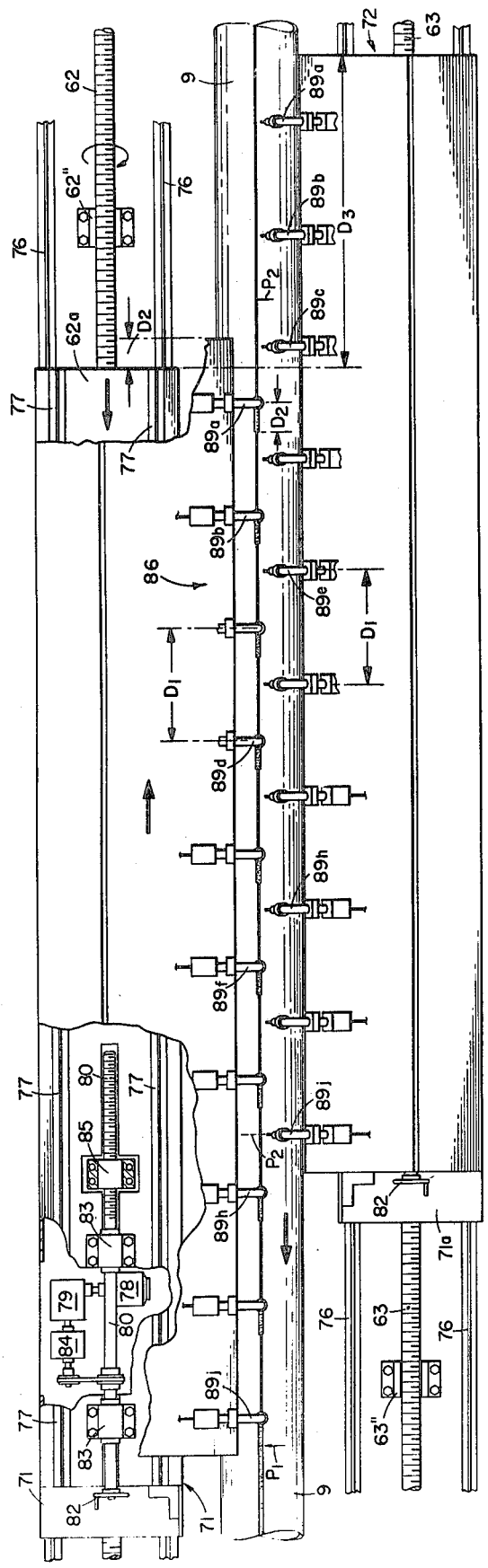
FIG. 10.
FIG. 9.
FIG. 11.

FIG. 12
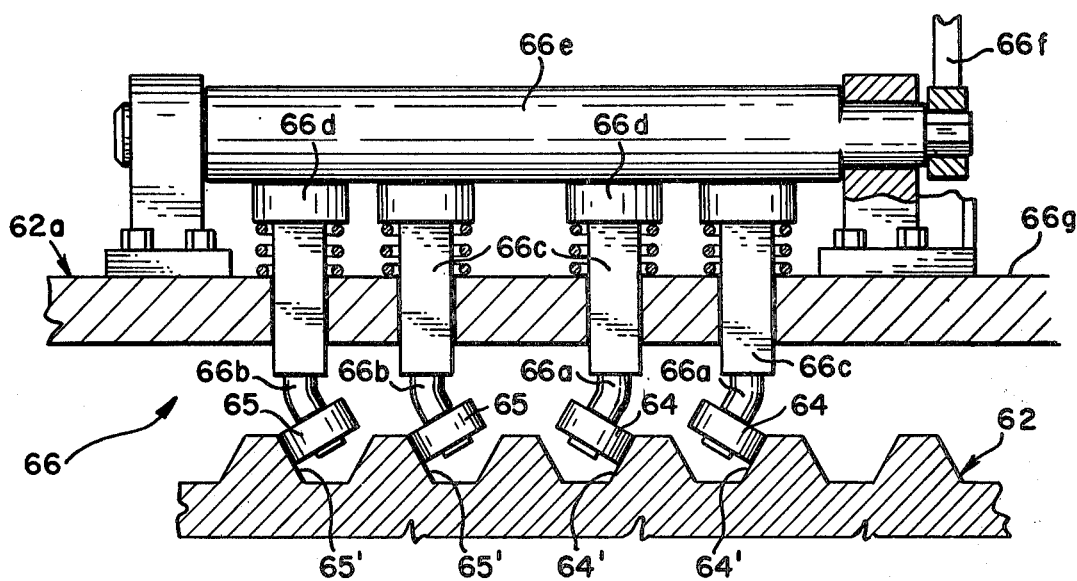
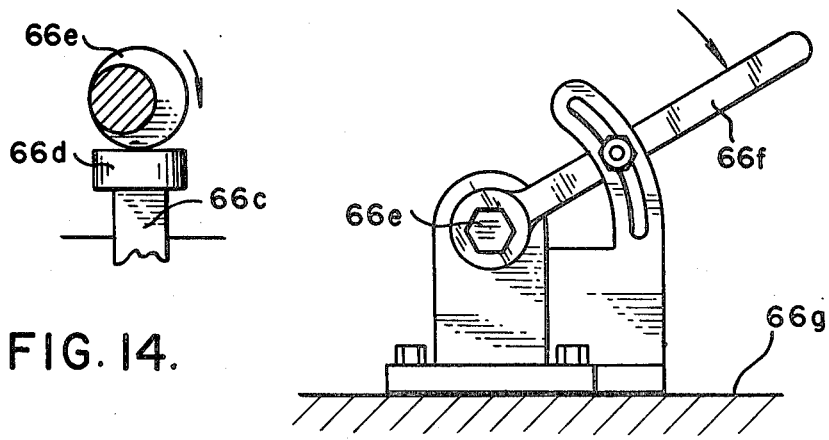
FIG. 14.
FIG. 13.

MULTIPLE WELDING HEAD SYSTEM FOR FABRICATING PIPE

BACKGROUND OF THE INVENTION (a) Field of the Invention

This invention generally relates to pipe fabrication and more particularly to pipe fabrication from rolls of flat metal plate by alternately welding the pipe's longitudinal seam with a pair of arc welding machines.

(b) Description of the Prior Art

Most pipeline fabricating plants whether onshore or offshore use sections of finished pipe which are welded together. A considerable amount of research went into the development of very fast welding machines for welding the circular seams between such abutting pipe sections. The speed of such pipeline fabrication can be improved by using longer pipe sections. In practice, however, space limitations preclude the use of vary long pipe sections, as for example, on an offshore pipe-laying barge.

U.S. Pat. Nos. 3,251,332 describes an alternate method of pipeline fabrication from rolls of flat metal plate. However, no commercial pipe laying barge is believed to use this patented method which has considerable drawbacks, the most serious of which are that the success of this method depends on the ability of maintaining the pipe-laying barge on course, and the relatively low welding speed.

Applicant has overcome the drawbacks of the prior art, and provides a pipeline fabricating method, using rolls of flat metal plate. Applicant's pipeline fabricating plant is very fast, economical, and lends itself especially for use on an offshore vessel.

SUMMARY OF THE INVENTION

A pipe is fabricated from rolls of successive flat metal plates by continuously moving the plates into a plate arc welding machine of this invention which welds consecutive ends of the plates while maintaining continuity of plate movement into a pipe-forming station which shapes the plate into a moving pipe having a longitudinal seam therealong. The longitudinal pipe seam is welded with a leapfrog arc welding machine of this invention having a pair of independently movable welding units positioned on the opposite sides of the moving pipe.

Each welding unit comprises a carriage movable in the same direction and at the same speed as the moving pipe, and a welding head carrier movable in both axial directions over the carriage. A bank of equally spaced-apart arc welding heads are pivotally mounted on the carrier.

Equal and overlapping length sections of the seam are consecutively welded by the two welding units. The welding heads of the first welding unit are adapted to weld equal and overlapping portions of a first section of the longitudinal seam, while its carriage is moving with the pipe and its carrier is moving opposite thereto. In the meantime, the second welding unit is moved in front of the first welding unit and the second welding unit will start welding in a similar manner the second overlapping section of the longitudinal seam immediately after the first section is welded. While the second welding unit is welding, the first welding unit is moved in front of the second welding unit, and the first welding unit will start welding the third overlapping section of the longitudinal seam when the second section is welded. Thus the welding units alternatingly weld alternate and overlapping sections of the longitudinal seam without interfering with the continuous movement of the pipe.

The invention also provides a synchronous propulsion system for the pipe and the welding machines thereby maximizing the speed of welding.

The guidance system for the moving pipe includes an improved stanchion for stabilizing the pipe's trajectory.

BRIEF DESCRIPTION OF THE DRAWINGS

FIG. 1 is a schematic representation of a pipeline fabricating vessel having a top deck adapted for continuously upspooling and straightening metal plate from rolls and seam welding the edges thereof with a plate arc welding machine, and a main deck for continuously fabricating a pipeline from the moving metal plate with a pipe leapfrog arc welding machine;

FIG. 2 is an enlarged side view of the roll turn table and of the straightener used in conjunction therewith;

FIG. 3 is a top schematic view of the propulsion system for moving the pipe and for moving the leapfrog arc welding machine;

FIG. 9 is an end view of the leapfrog welding machine taken on line 9—9 in FIG. 7;

FIG. 10 is a side view of the left-hand welding unit of the leapfrog welding machine, showing its carrier partly displaced relative to its carriage and taken on line 10—10 in FIG. 9;

FIG. 11 is a top view of the leapfrog welding machine shown in FIG. 10 when the left-hand welding unit is welding, and the right-hand welding unit is in front thereof and at its start welding position;

FIG. 12 is a side view, partly in section, of the driving mechanism for the carriage used in the leapfrog welding machine;

FIG. 13 is a fragmentary end view of the pressure exerting mechanism shown in FIG. 12;

FIG. 14 is a fragmentary view illustrating the cam action for the rollers of the drive mechanism shown in FIG. 12;

GENERAL DESCRIPTION OF THE PIPELINE FABRICATING VESSEL

Figure 4:
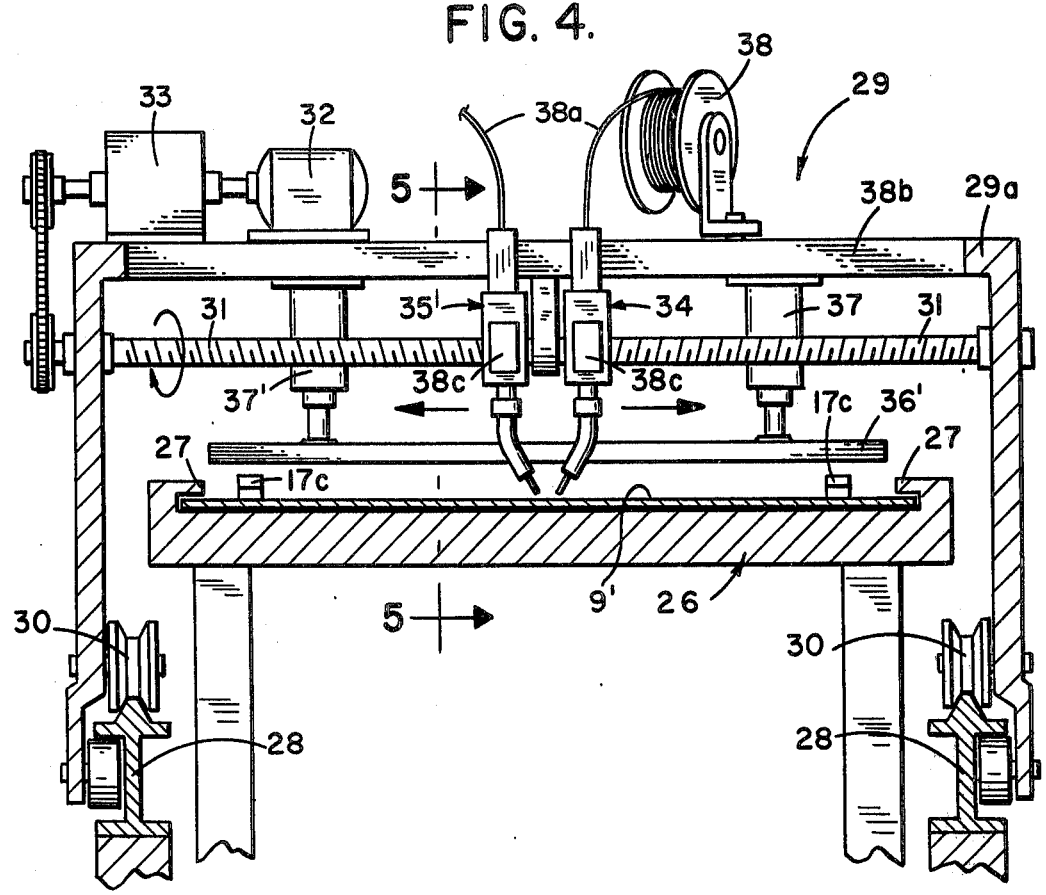
FIG. 4 is a view on line 4—4 in FIG. 1 of the plate welding machine.

While the invention has general application for a pipe making plant, it will be described for purposes of illustration in connection with a pipeline fabricating vessel, generally designated as 10 (FIG. 1). Vessel 10 includes a reduced area top deck 11 and a main deck 12. Both decks are provided with a crane system 13 having an arm 14 which consecutively picks-up a roll 15 of metal plate from its storage compartment (not shown) preferably on the main deck 12 and positions it on the edge of a ramp 16 having a slight convex curvature.

When the roll rides down the ramp, the metal's leading end 17 becomes substantially straightened out. End 17 is releasably secured to ramp 16 by a pair of spaced-apart hydraulic jaws 18. Positioned in front of ramp 16 is a turn table 20 (FIG. 2) having a pair of roller supports 21 which rotatably support a front feed roll 15a and a back-up roll 15b. Table 20 can be rotated counter-clockwise by an electric motor 22 with a brake. Motor 22 is coupled to a gear box 23. The leading plate end 17 of each roll 15 is inserted between the powered rollers 25' of a straightener 25. When the front roll 15a empties its load, table 20 is rotated 180° and the leading end 17 of the back-up roll 15b is quickly inserted between the straightening rollers 25'.

DESCRIPTION OF THE PLATE WELDING MACHINE

The straightened metal plate 9' is pulled over a metal table 26 having aligning side channels 27 (FIGS. 4-6) for retaining the plate while it moves over the table. Along each side of table 26 is a V-rail 28 over which rides a plate welding machine 29 on rollers 30.

GENERAL DESCRIPTION OF THE PLATE WELDING MACHINE

The plate welding machine 29 preferably comprises a drive screw 31 which is driven by a reversible electric motor 32 through a gear box 33. One half of screw 31 has a right-hand thread, and the other half has a left-hand thread. Threadedly coupled to the two-halves of screw 31 are at the center of the screw a pair of arc welding heads 34, 35, which can move away from or toward each other depending on the direction of rotation of screw 31. The start welding position is at the center of the plate when the heads are opposite to each other, as shown, and they gradually move apart in a plane perpendicular to table 26 so as to weld the seam 17b between trailing end 17a of the front plate and the leading end 17 of the back-up plate, which, when inserted between the powered straightening rollers 25', quickly moves to abut against the trailing end 17a. Prior to such abutment, the operator manually inserts in the seam 17b a pair of cleats 17c, one of which triggers an electric switch 36a that simultaneously causes (1) the lowering and energization of powerful electromagnets 36, 36' that securely clamp plate portions 17, 17a, respectively, to table 26, (2) the housing 29a of the welding machine 29 to ride on rails 28 with and at the speed of the moving plate, and (3) the energization of motor 32 which starts driving screw 31, thereby moving the welding heads 34, 35 away from each other at a uniform speed, depending on the plate's thickness. As a result, there will be no discontinuity in the supply of metal plate to the pipe-fabricating station subsequently described.

DETAILED DESCRIPTION OF THE PLATE WELDING MACHINE

Referring to the plate welding machine 29 in more particular, the abutment between the trailing end 17a of the front plate and the leading end 17 of the back-up plate is continuously maintained by the powerful electro-magnets 36, 36' which are vertically suspended from a pair of air cylinders 37, 37', respectively. The cleats 17c are removed after the clamping of the plates is effected by the magnets.

Each welding head is provided with a swivel reel 38 carrying welding wire 38a. The top end of each welding head is square shaped and is guided within a slot 38b in the housing 29a. The slot maintains the welding heads 34, 35 in perfect alignment along the seam 17b, as they separate from each other during the seam welding operation. The amount of dispensed wire 38a is controlled by a feed controller 38c.

The housing 29a rolls on the rails 28 at the same speed as the moving metal plate 9', while the welding heads 34, 35 move away from each other to carry out their welding operation at the end of which the housing 29a will assume a position as depicted by the dotted lines in FIG. 1. The side guides defining channels 27 (FIG. 4) do not fully extend to the end of table 26 so as to allow the welding heads to weld the outer ends of seam 17b.

Figure 5:
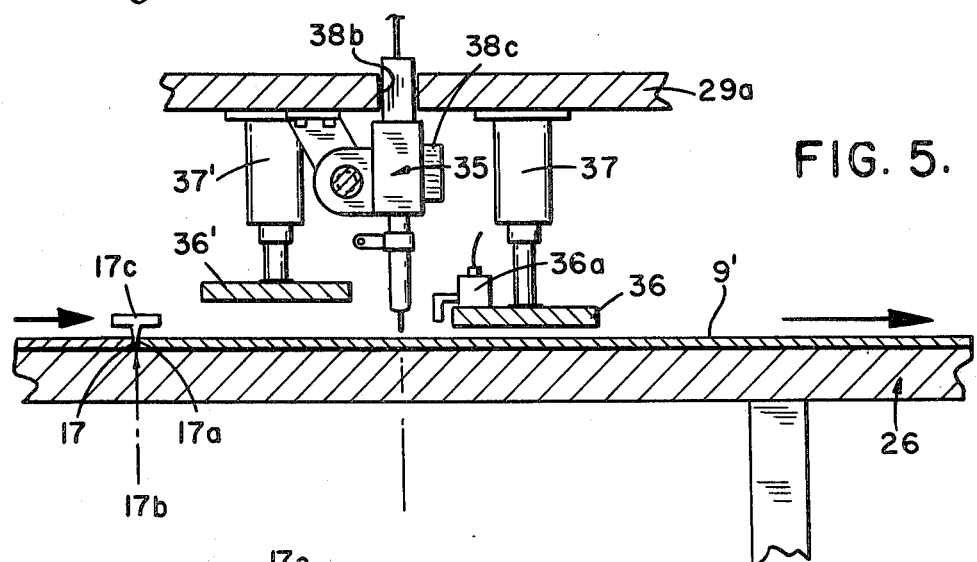
FIG. 5 is a detail view on line 5—5 in FIG. 4.
Figure 6:
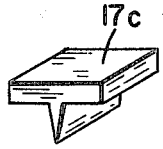
FIG. 6 is a perspective view of a cleat shown in FIG. 5.
Figure 7:
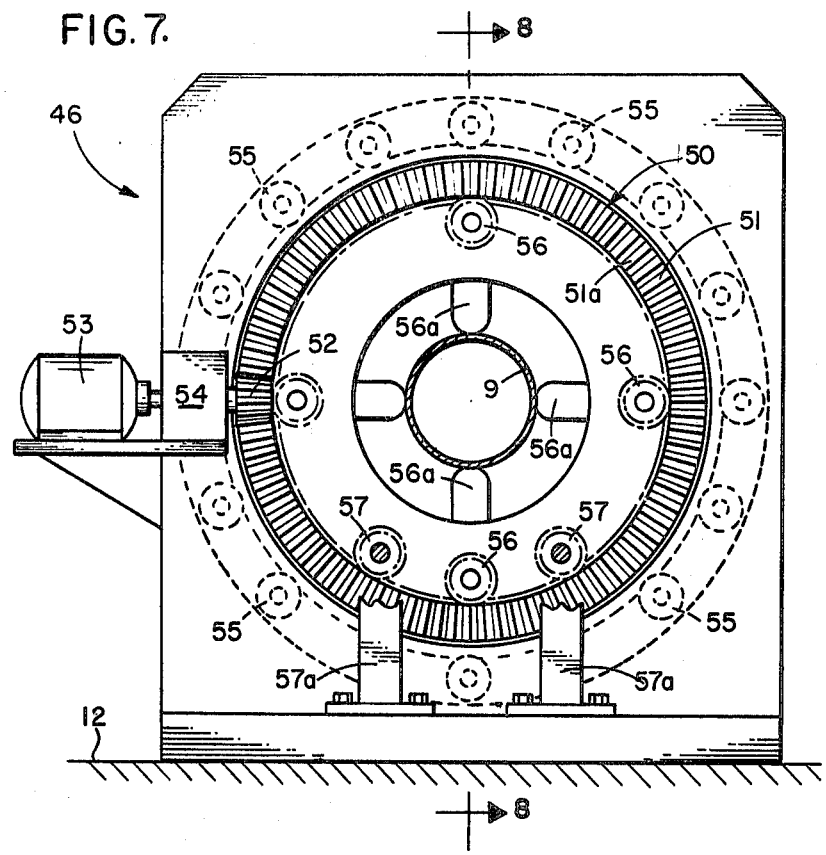
FIG. 7 is a front view of the main drive ring of the propulsion system taken on line 7—7 in FIG. 1.
Figure 8:
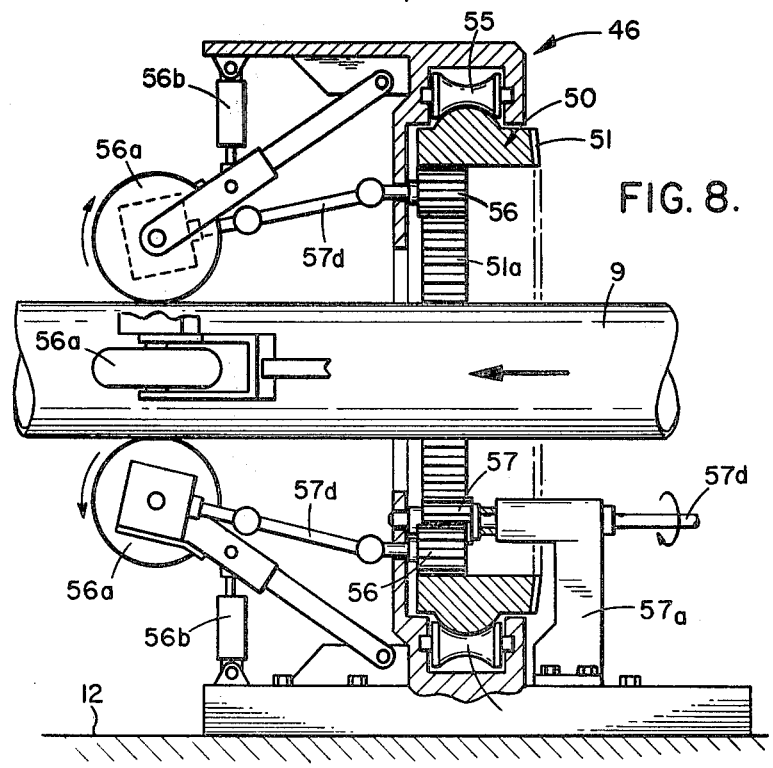
FIG. 8 is a side, cut-away view, of a portion of the propulsion system taken on line 8—8 in FIG. 7.

Upon completion of the seam weld, the operator (1) removes electric power from the electro-magnets 36, 36', (2) raises them to their positions as shown in FIG. 5 with the air cylinders 37, 37', and (3) returns the machine's housing 29a to its start position adjacent to the straightening rollers 25 (FIG. 1). The return trip of housing 29a can be effected manually or with a suitable motor (not shown) coupled to one of the rollers 30. The operation of the electro-magnets and of their support air cylinders is controlled by suitable switches and valves (not shown), respectively, either manually or automatically.

To facilitate the further understanding of the invention and to simplify the drawings, no detailed description will be given of the various hydraulic, pneumatic and electric circuits which are used for powering the welding heads and the various components of the pipeline fabricating plant 10, as they are commercially available and of conventional design, except as otherwise noted herein. Also, the individual arc welding heads 34, 35 are commercially available, for example, from the Hobart Company, Troy, Ohio.

GENERAL DESCRIPTION OF THE PIPE-FORMING STATION AND OF THE MAIN DECK

The continuously moving metal plate exiting from table 26 is supported by supports 39 (FIG. 1) and is guided through a vertical guide which can include rollers 40 extending from the top deck 11 and over into main deck 12. The plate enters a pipe-forming station 42 having therein conventional shaping rollers for shaping the plate 9' into a tubular pipe 9 with a longitudinal seam 41 therealong ready to be welded. Also positioned in the pipe-forming station 42 can be a spray arc welding machine (not shown) which can be used to fill the bottom portions of very deep seams, so as to facilitate the subsequent arc welding thereof, as will be apparent to those skilled in the art.

The seam 41 is arc welded by a leapfrog arc welding machine 44. The seam welded pipe 9 exiting from the welding machine 44 enters an inspection-and-repair station 45 which may include conventional X-ray machines, etc., for inspecting the welded seam and making repairs thereto, if required.

The welded and inspected pipe 9 is pulled forward continuously by a main propulsion system 46 and is gradually lowered from the main deck 12 into the body of water 48 over a plurality of spaced guiding and supporting stanchions 47.

DETAILED DESCRIPTION OF THE PIPE'S PROPULSION AND OF THE DRIVE MECHANISM FOR THE LEAPFROG WELDING MACHINE

With reference now to FIGS. 1, 3, 7-8 and 11-14, the main propulsion system 46 includes a rotatably mounted ring gear 50 having on the front side thereof an annular set of teeth 51 which engage a pinion 52 driven by an electric motor 53 through a suitable multi-speed transmission 54. The ring gear 50 rides on a plurality of support rollers 55 positioned around its outer circumference. The main ring gear 50 also has an inner cylindrical set of teeth 51a that drive a plurality of gears 56 and a pair of gears 57 which meshingly engage with teeth 51a.

Driven gears 56 drive a set of circumferentially arranged rubber tires 56a which provide the required axial force for pulling the pipe 9. The amount of pressure exerted by the rubber tires, and hence the pulling force exerted on the pipe, is controlled by hydraulic cylinders 56b.

One of the driven gears 57 together with an electric motor 59 selectively rotate a drive screw 62, and the other gear 57 together with another electric motor 59 selectively rotate a drive screw 63. Drive screw 62 is maintained in perfect alignment by a plurality of longitudinally spaced-apart half bearings 62" (FIG. 11).

The driving mechanism for screw 62 or screw 63 includes a support bearing 57a, a clutch 57b, a gear box 59c, and another clutch 59a coupled to the shaft of motor 59.

Gear box 59c drives a drive shaft 61 through universal joints 57d. Thus drive shaft 61 can be powered either by driven gear 57 with the clutch 57b in and clutch 59a out, or by motor 59 with clutch 57b out and clutch 59a in.

Mounted for back-and-forth movement on the threads of screws 62, 63 are carriages 62a, 63a, respectively.

The driving mechanism for each carriage is generally designated as 66 (FIGS. 12-14). It includes a first set of shafts 66a carrying cylindrical rollers 64 riding over the leading edges 64' of the screw thread, and a second set of shafts 66b carrying cylindrical rollers 65 riding over the trailing edges 65' of the screw thread. Shafts 66a and 66b are slidably mounted in support sleeves 66c secured to the main frame 66g of the welder carriage 62a. Each of shafts 66a and 66b has at the top end thereof a pressure pad 66d. The position of each pad is adjusted by a cam 66e to eliminate free play between the rollers 64, 65 and drive screw 62. Cam 66e is conveniently rotated by a handle 66f, as shown.

DETAILED DESCRIPTION OF THE LEAPFROG WELDING MACHINE

To simplify the specification, the description of symmetrical or analogous parts is held to a minimum. For example, since the leapfrog welding machine 44 comprises a left-hand welding unit 71 and a right-hand welding unit 72, which are otherwise identical in all respects, only the description of welding unit 71 will be given.

Welding unit 71 consists of the carriage 62a and of a welding head carrier 73. Carriage 62a is driven by its driving mechanism 66, as previously described. Carriage 62a rides on a set of wheels 75 over rails 76. Carrier 73 rides over two longitudinal aligning V-guides 77 on carriage 62a which supports an electric motor 78 driving a gear box 79 which in turn drives a screw 80 through a chain 81. At the start of a welding operation, the position of carrier 73 can be very accurately and manually adjusted by an adjustment wheel 82 on screw 80. Screw 80 rotates within bearings 83 and its rotation can be engaged and disengaged through a clutch 84. A threaded sleeve 85 is secured to the bottom side of carrier 73 and threadedly engages screw 80, thereby moving the carrier back and forth on screw 80 by reversing the energization of motor 78, or carrier 73 can be moved manually by turning wheel 82.

The carriage 62a can be driven by pinion 57 at the same speed and in the same direction 8 as the moving pipe 9, while the carrier 73 when its welding heads are welding is made to move in the opposite direction 7, which is the welding direction of seam 41. The expressions "front" and "back" are with reference to direction 7.

Pivotally mounted on pivots 88 is a bank 86 of arc welding heads 89 having flux hoppers 90 and wire supply spools 91. In the drawings, bank 86 is illustrated as having ten (10) welding heads equally spaced from each other longitudinally, say a distance $D_1$ of four (4) feet. Each head 89 when welding is brought into welding position by contracting an air or hydraulic cylinder 92. The ends of the cylindrical pipe forming seam 41 are continuously maintained in abutment by support rollers 93. The speed of wire dispensing is controlled by a controller 94 forming part of the welding head 89.

DETAILED DESCRIPTION OF OVERALL OPERATION

Arm 14 consecutively picks up plate rolls 15 and positions them over ramp 16 to thereby prepare them for being mounted on the turn table 20. Initially two such rolls 15a and 15b are mounted. When the front roll 15a completely unwinds in the counter-clockwise direction, table 20 is rotated 180° counter-clockwise and the leading end 17 of the back-up roll 15b will be made to enter between the powered straightening rollers 25. This leading end 17 will rapidly accelerate to catch up with and abut against the trailing end 17a of the plate moving away from table 26. As soon as both ends abut and form a seam 17b therebetween, the plate welding machine 29 is initiated when cleat 17c hits switch 36a. The cleats are then removed. The energization of the magnets 36, 36' causes housing 29a of the welding machine 29 to move with and in the same direction as the metal plate 9'. Screw 31 is rotated in a direction so as to linearly move apart the welding heads 34, 35 while they continue welding seam 17b. By the time welding machine 29 reaches the weld-finish position on the top deck, as shown by the dotted lines in FIG. 1, the lateral seam 17b between the front and back plates is completely welded. Power is removed from the magnets and welding machine 29 is then moved back to its weld-start position, as shown by the solid lines in FIG. 1.

The metal plate 9' continuously enters the pipe-forming station 42 which is of conventional design and typically includes a plurality of forming or transition rollers, as is well known to those skilled in the art and no further description thereof is believed necessary.

If the thickness of the metal plate makes seam 41 too deep, the bottom of the seam will first be spray arc welded. The tubular pipe 9 is now ready to be seam welded by the leapfrog welding process.

In FIG. 11, welding unit 72 is in front of welding unit 71 and is stationary relative to the moving pipe. Unit 72 is shown in its desengaged position with its drive screw 63 not rotating.

Previously and with reference to direction 7, welding unit 72 was in back of welding unit 71 when unit 71 was stationary relative to the moving pipe and welding unit 72 was completing its welding operation of a seam section up to point $P_1$.

More particularly, at the rear end of each of welding units 71, 72 (FIG. 11) is a platform 71a that allows an operator to stand on and ride with the welding unit. When welding unit 72 was finishing its welding operation, its front welding head 89a was on mark $P_1$ thereby completing welding its portion of the seam section welded by unit 72. At that instant, the operator of unit 72 removes the electric power from the welding heads, pivots the welding heads away from seam 41, disengages clutch 57b which automatically engages clutch 59a, energizes motor 59 to drive screw 63 which brings unit 72 to its weld start position in front of unit 71, and simultaneously reverses the rotation of motor 78 so as to move carrier 73 in the direction 8 to its start position relative to its carriage 63a.

When the welding head 89a of welding unit 72 was approaching the mark $P_1$ and immediately after the operator of welding unit 72 tilted his welding heads 89 away from seam 41, the operator of welding unit 71 (1) tilts his welding heads 89 toward seam 41 and engages clutch 57b thereby starting to drive carriage 62a in the same direction 8 and at the same speed as the moving pipe 9, (2) manually adjusts wheel 82 so that its last welding head 89j is at the mark $P_1$, (3) energizes motor 78 which starts driving carrier 73 in the direction 7 opposite to the direction 8 of the moving pipe 9, and (4) energizes its welding heads 89 which start welding their respective portions of the seam section. Each welding head 89 will weld an identical seam portion, equal to the spacing between the welding heads, until the welded portions will overlap and form a welded seam section between points $P_1$ and $P_2$.

The number of welding heads used in each bank will depend on the desired speed of welding, the greater the number of welding heads, the greater the welding speed will be. In the illustrated embodiment (FIG. 11), each bank 86 consists of ten (10) welding heads spaced from each other by a distance $D_1$ equal to four (4) feet. Accordingly when a bank welds a section $P_1$–$P_2$ of 40 feet, each welding head will have welded a 4 ft. seam portion, with the portions overlapping each other. The carriage will therefore have traveled a distance of 40 (10 × 4 = 40) feet in the direction 8 of the moving pipe, and the carrier will have traveled a distance of 4 feet in the opposite direction 7.

Should the nature of the welding operation require two passes by each welding head, it is possible to employ double welding heads at each welding station, and each double welding head will for all practical purposes operate as a single unit.

In FIG. 11 welding unit 71 is shown at a position after each welding head had already welded a distance $D_2$ and the carriage has traveled a distance $D_3 = 10\, D_2$. Welding unit 71 will continue welding until head 89a reaches point $P_2$ on seam 41. Since the carriage 62a is moving in the direction 8 of the moving pipe 10 times faster than each welding head is moving, point $P_2$ will be in front of welding head 89j of welding unit 72 when the portions welded by the heads of unit 71 overlap.

At that point in time, the operators of welding units 71 and 72 will repeat the operational steps previously described to thereby continue with the leapfrog welding process.

After seam 41 is welded by the leapfrog welding machine 44, pipe 9 enters the inspection-and-repair station 45 in which it is fully inspected for defects, and then it is gradually lowered over stanchions 47 into the body of water 48.

DESCRIPTION OF THE SUPPORT STANCHIONS

Figure 15:
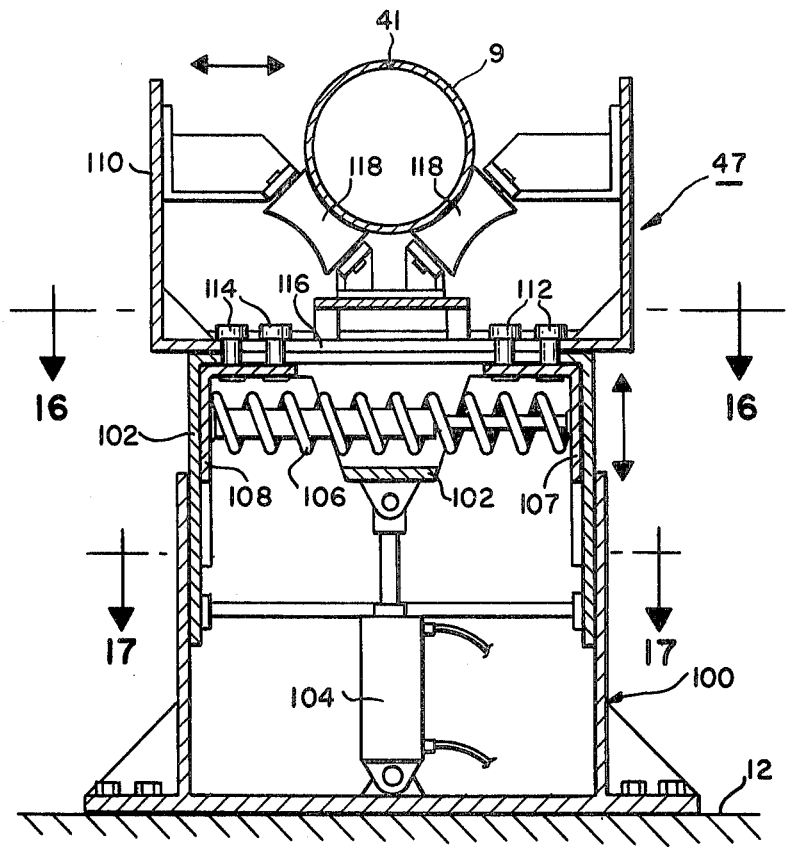
FIG. 15 is a view on line 15—15 in FIG. 1 showing a pipe-supporting stanchion.
Figure 16:
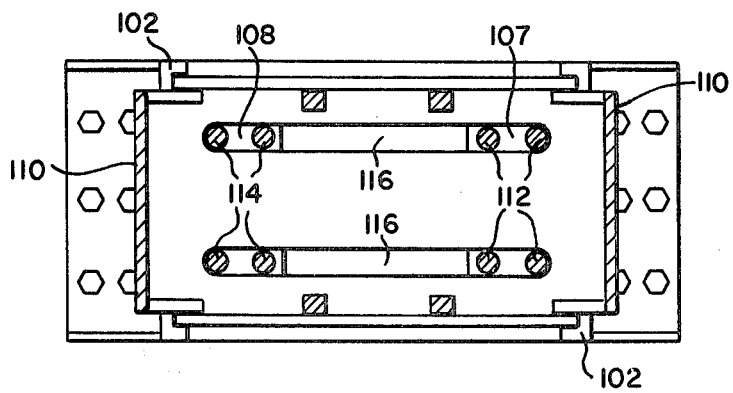
FIGS. 16 and 17 are views on lines 16—16 and 17—17 respectively, in FIG. 15.
Figure 17:
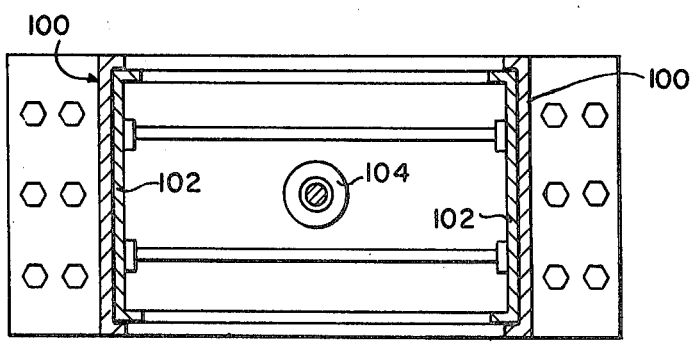

Each stanchion 47 (FIGS. 15–17) includes a main frame 100 which is bolted to the main deck 12. Slidably mounted over main frame 100 is a support frame 102 that is movably supported by an air cylinder 104. Inside frame 102 is a coil spring 106 positioned between a pair of L-shaped brackets 107, 108. Slidably mounted over frame 102 is a top frame 110 which is coupled to bracket 107 through two pairs of bolts 112, and to bracket 108 through two pairs of bolts 114. Bolts 112, 114 ride within inner slots 116 in the bottom wall of frame 110. The pipe 9 is rollably supported by a pair of contour rollers 118, the elevation of which can be adjusted with the air cylinder 104 which also acts as a cushioning spring for the descending pipe.

Any side thrust exerted on the descending pipe will cause top frame 110 to shift either to the left or to the right, thereby compressing spring 106 which will tend to react against the side thrust and to thereby stabilize the descending trajectory of the moving pipe into the body of water 48.

What is claimed is:

1. A system for fabricating a pipe from rolls of flat metal plate, comprising:
   means for continuously moving the plate;
   pipe forming means for shaping the moving plate into a pipe having a longitudinal seam therealong;
   a leapfrog arc welding machine having a pair of independently movable welding units movably positioned on the opposite sides of the moving pipe,
   each welding unit comprising a carriage movable in the same direction and at the same speed as the moving pipe, a carrier movable over the carriage, and
   a bank of equally spaced-apart welding heads pivotably mounted on said carrier;
   the welding heads of one welding unit welding equal and overlapping portions of one section of the longitudinal seam, when its carriage is moving with the pipe and its carrier is moving opposite thereto, while the welding heads of the other welding unit are positioned to weld a consecutive overlapping section of the longitudinal seam when the welding heads of said one welding unit stop welding, whereby said pair of welding units alternatingly weld alternate and overlapping sections of the longitudinal seam without interfering with the continuous movement of the pipe.

2. A pipeline fabricating vessel comprising:
   a top deck and a main deck;
   means on said top deck for continuously moving a flat metal plate;
   means on said main deck for shaping the moving flat metal plate into a moving pipe having a longitudinal seam therealong;
   means for continuously welding alternate sections of the longitudinal seam;
   a plurality of stanchions for supporting and guiding the pipe from the main deck;

said welding means comprise a left-hand welding unit and a right-hand welding unit positioned to receive said moving pipe between said units;

each welding unit including a carriage and a carrier movable thereon;

means including a drive screw for driving each carriage; and a bank of arc welding heads pivotably mounted on each carrier.

3. The vessel of claim 2, and propulsion means for pulling said pipe between said welding units, said propulsion means comprising:

a rotatably mounted ring gear having on the front side thereof an annular set of teeth, a pinion engaging with said teeth and means for driving said pinion thereby rotating said ring gear;

said ring gear having an inner cylindrical set of teeth;

a plurality of driven gears meshingly engaging with said cylindrical set of teeth; and a wheel operatively coupled to each driven gear for engaging and continuously pulling said pipe through said ring gear.

4. The propulsion system of claim 3, and a pair of gears meshingly engaging with said cylindrical set of teeth;

a pair of drive screws operatively coupled to said pair of gears, and each drive screw propelling one of said carriages.

* * * * *